United States Patent [19]
Ellison, Jr.

[11] 3,918,203
[45] Nov. 11, 1975

[54] PET ACCESS PANEL

[76] Inventor: Clinton E. Ellison, Jr., 1636 N. Wells, Chicago, Ill. 60614

[22] Filed: May 23, 1974

[21] Appl. No.: 472,589

[52] U.S. Cl. .................. 49/168; 49/34; 160/DIG. 8
[51] Int. Cl.² .......................................... E06B 7/30
[58] Field of Search ............ 49/168, 368, 388, 395, 49/9, 34, 69; 160/DIG. 8, 179, 180

[56] References Cited
UNITED STATES PATENTS

| | | | |
|---|---|---|---|
| 2,560,661 | 7/1951 | Poovey | 160/DIG. 8 |
| 2,756,466 | 7/1956 | Garland | 49/368 |
| 2,832,406 | 4/1958 | Turenne | 160/DIG. 8 |
| 3,184,803 | 5/1965 | Peel | 49/395 X |
| 3,654,733 | 4/1972 | Blackwell | 49/168 |

FOREIGN PATENTS OR APPLICATIONS

| | | | |
|---|---|---|---|
| 1,401,338 | 4/1965 | France | 49/9 |

Primary Examiner—Kenneth Downey
Attorney, Agent, or Firm—Roy E. Petherbridge; Robert L. Lindgren; Edward D. Gilhooly

[57] ABSTRACT

A pet access panel including swinging doors which permit an animal egress from and entry into a room and the like. The panel supporting the doors is adapted to be attached to a sliding door or other similar structure without modification thereof. The panel functions to seal the room from outside weather conditions when the doors are closed whereby the door can be readily opened in two directions to permit passage by a pet. The doors are provided with a protection element to insure that a pet can safely open the doors unassisted.

5 Claims, 1 Drawing Figure

PET ACCESS PANEL

BACKGROUND OF THE INVENTION

This invention relates in general to closures and in particular, to a pet access panel.

More specifically, the invention relates to a pet access panel having pivotally mounted doors permitting entry and egress of a pet from a room and the like. The panel is adapted to be attached to a sliding door or other similar structure such as found adjacent patios, yards, balconies or other areas. The pet access panel of the invention includes swinging doors which safely permit a pet to pass therethrough unassisted. In a closed position the doors provide adequate insulation and protection from existing weather conditions for the interior of a dwelling.

The owners of small pets continually face the problem of having to leave their animals unattended in a home, apartment and the like. Since a pet must be attended to with respect to natural functions or given an opportunity to o into fresh air, particularly if locked in an apartment or house for a relatively long duration, pet owners have had to resort to various procedures to insure that their animal can periodically leave the dwelling. Often the pet owner must arrange with neighbors or others to personally walk or attend to the animal needs.

Several attempts have been made in the prior art to provide means which allow unattended entry or egress by an animal from a dwelling. However, these prior art techniques providing access of an animal to the exterior have been deficient in several aspects. For example, many prior art pet access methods have required extensive modifications of windows, doors and similar structures which are not only expensive to make but which are not permitted in many rental dwellings such as apartments. Moreover, it is extremely desirable that the access door remains sealed shut after entry or egress by a pet to insulate the interior of the dwelling from outside weather conditions. The doors heretofore utilized have not accomplished both ready passage by an animal and complete protection against weather conditions when closed. Prior access panels have also been unacceptable because many pets are reluctant to pass through them because of their difficulty to open or fear of injury. Actually, because of the design of many prior systems, these panels have been found to inflect injury to the pet.

SUMMARY OF THE INVENTION

It is, therefore, an object of the invention to provide unattended entry and egress of a pet through an access door.

A further object of the invention is to minimize injury to a pet moving through an access door.

Another object of the invention is to minimize effort required of an animal to pass through the access door.

A still further object of the invention is to provide an effective sealable pet access door.

These and other objects are attained in accordance with the present invention wherein there is provided an improved pet access panel having a door therein to permit unattended entry and exit from a dwelling and the like by a household animal. The panel of the invention is adapted to be readily attached to a structure such as a sliding door with a minimum of labor and modification required whereby the panel is capable of providing sealed protection from outside weather conditions. The panel of the invention includes an access door which readily permits an animal to pass therethrough with a minimum of effort and injury. The swinging door of the invention includes protective surfaces to not only reduce injury to animals passing through the door but which encourages the animal to swing open the doors.

The pet access door of the invention permits small animals to pass unattended from a dwelling such as an apartment without the presence of a human. Thus, an animal can move at will to a balcony to perform natural functions or for fresh air and return to the dwelling as desired. The panel may be utilized in conjunction with a sliding door which is positioned adjacent a balcony, yard, patio and the like. The invention herein disclosed is effectively safe to the animal and is inexpensive to manufacture.

BRIEF DESCRIPTION OF THE DRAWINGS

Further objects of the invention together with additional features contributing thereto and advantages accruing therefrom will be apparent from the following description of an embodiment of the invention when read in conjunction with the accompany drawings wherein.

DESCRIPTION OF THE PREFERRED EMBODIMENTS

Figure 1:
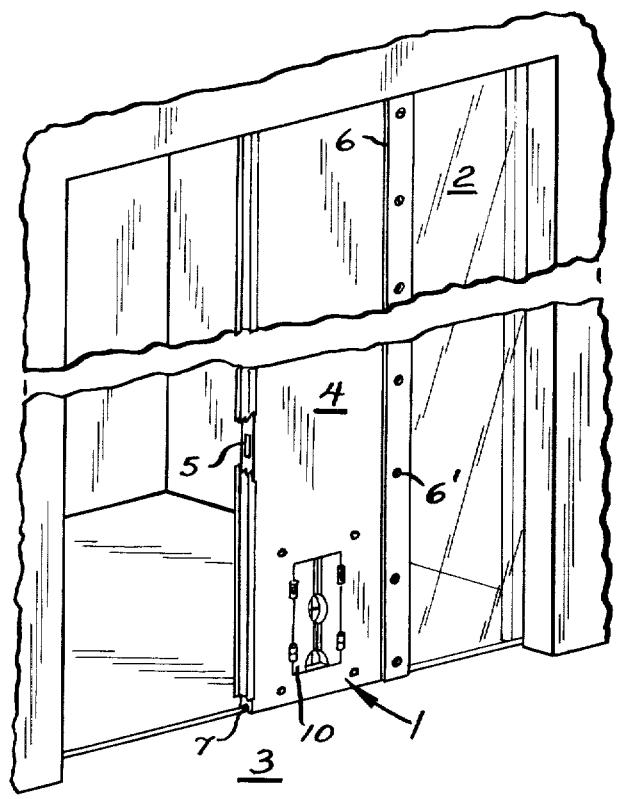
FIG. 1 is a perspective illustration of the pet access panel of the invention mounted on a sliding door.

Referring to FIG. 1 there is illustrated the pet access panel of the invention in position attached to a sliding door of conventional uesign. The pet access panel 1 is attached to sliding door 2 which is situated adjacent an exterior area 3 such as a patio, balcony, yard and the like. Access panel 1 includes an upright member 4 which is designed to have a height corresponding to the sliding door upon which it is mounted and may be of any desired width. Panel 4 is constructed of any suitable material such as metal, wood, plastic or any other type substance. A conventional lock 5 is provided on an edge of panel 4 to permit the sliding door to be closed and locked with the presence of panel 4.

Upright panel 4 can be attached to the end of sliding door 2 by any attachment means such as by a U-shaped end portion 6 which is attached to the end of the panel whereby the sides of the U-shaped portion 6 embrace the inside and outside of the edge of door 2. A series of screws 6' are utilized to attach end portion 6 to the door wor secure coupling. The bottom of panel 4 is provided with a U-shaped slot 7 allowing the panel and door 2 to slide along conventional tracks provided for sliding doors. In the event that other forms of slides are used, U-shaped slot 7 can be modified to permit movement with respect to the bottom of the floor.

Panel 4 includes a pet access door 10 which allows an animal such as a dog or cat to pass unattended therethrough even when panel 4 is locked by lock 5 in a closed position. Door 10 includes two swinging sections 11a and 11b which are pivotally mounted on panel 4 along a vertical axis by means of conventional hinges 12. Hinges 12 may include resilient means to insure that the doors return to a closed position after passage by an animal. As an aid in maintaining the door closed against various weather conditions, the top of each panel includes a magnetic element 30. Magnetic element 30 is adapted to couple magnetically with a metallic or magnetic element (not shown) embedded in panel 4 in confrontation to element 30.

Figure 3:
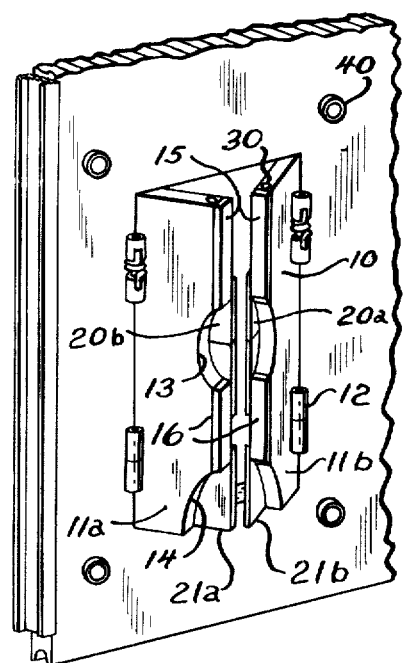
FIG. 3 is a perspective partial view of the panel of FIG. 1 with the doors open.
Figure 2:
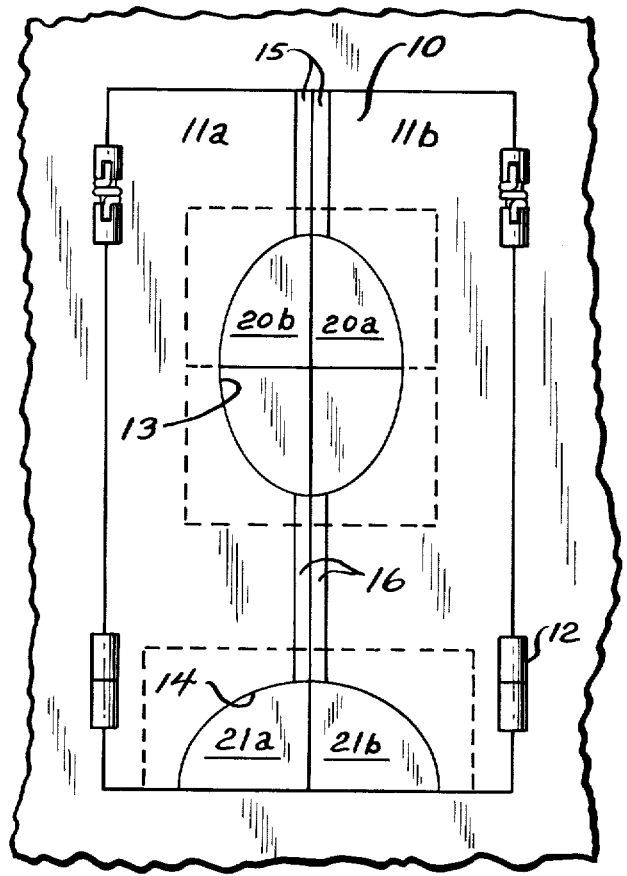
FIG. 2 is a partial enlarged front schematic illustration of the pet access door of the panel of FIG. 1.

Sections 11a and 11b are constructed of any rigid materials such as metal, wood, plastic and the like and generally selected to be of a weight to allow an animal to easily open them as he pushes through. However, the material used to form sections 11a and 11b are designed to be of sufficient strength in conjunction with the resiliency of hinges 12 to seal the panel against outside weather conditions. Panel 4 is provided with a number of snap projections 40 to secure a snap-on cover over door 10 in the event it is desired that the door be sealed. Each of sections 11a and 11b include a cutout portion 13 located in the midportion of the sections in confronting relationship to form opening 13a as best shown in FIGS. 2 and 3.

A second cutout portion 14 is provided in elements 11a and 11b at the bottom to provide a second lower opening. Suitable resilient elements 20a and 20b such as rubber, soft plastic and the like are respectively secured by any suitable technique such as by adhesive or screw fasteners to sections 11a and 11b to cover cutout portion 13 in a closed position of the doors. Likewise, two separate similar elements 21a and 21b are respectively attached to the bottom of elements 11a and 11b to cover opening 14 in a closed position as shown in FIGS. 1 and 2.

The function of the elements 20a and 20b, 21a and 21b is to both protect the animal from injury as it passes through doors 10 and to encourge a pet to press the door open in view of their relatively soft and pliable construction. The access panel of the invention is provided with two separate cutouts 13 and 14 because from observation it has been found that certain animals prefer to push through the upper opening 13 while others prefer the lower area 14. Particularly, cats have been observed to prefer to press their head through upper cutout portion 13 before actually pushing their bodies through. On the other hand, some animals such as dogs like to enter or open the door by pushing through from the bottom in the general area of cutout 14. To aid the pet in opening door 10, elements 20a and 20b of opening 13 can be severed along a horizontal plane to increase flexibility of the material. Smaller portions 15 and 16 of resilient material are also attached to the edge of sections 11a and 11b as further protection to the pet.

Figure 4:
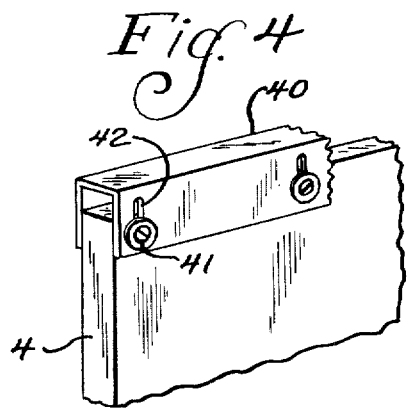
FIG. 4 is an end perspective illustration of a second embodiment of the pet access panel of the invention.

Referring now to FIG. 4 there is illustrated a modification of the panel of the invention. The modification shown in FIG. 4 enables a panel to be universally used in conjunction with doors of varying heights by a simple adjustment process. The feature shown in embodiment of FIG. 4 is intended to be at either the top or the bottom of the panel along its horizontal dimension whereby a cap-like member 40 having a configuration to correspond to the panel is inserted over the top of the door as shown in FIG. 4. The cap members on each end include a pair of screw elements or bolts 41 which are inserted into panel 4 through an elongated slot 42 provided in cap 40. Thus, it should be apparent that upon the loosening of the attachment element 41, the cap can be moved relative to panel 4 to either increase or decrease the height thereof as needed for installation.

While the invention is described with reference to preferred embodiments, it will be understood by those skilled in the art that various changes be made and equivalents may be substituted for elements thereof without departing from the scope of the invention. In addition, many modifications may be made to adapt a particular situation or material to the teachings of the invention without departing from its essential teachings. Therefore, it is intended that this invention not be limited to the particular embodiment disclosed as the best mode contemplated for carrying out this invention, but that the invention will include all embodiments falling within the scope of the appended claims.

What is claimed is:

1. A pet access panel comprising
    panel means adapted to be attached to a closure,
    said panel means including pivotally mounted door means to permit unattended passage by an animal,
    said door means includes two sections pivotally mounted to the panel means to substantially contact each other at respective edges in a closed position and adapted to open in two directions by contact by an animal,
    said sections each having a rigid portion and a flexible means attached thereto,
    said rigid portion of each of said two sections having a substantially planar edge surface of predetermined thickness and at least one corresponding open area extending from said planar surface into said rigid portion to create an opening through said rigid portion in a closed position of the door means,
    said flexible means including at least one resilient element attached to the planar surface of each of said two sections to create said respective edges,
    said flexible means further including a pair of flexible coverings having a portion respectively attached to the rigid portion of each of said sections to cover said at least one opening in a closed position of the door means, and
    said flexible covering further having unattached portion being bendable with respect to said rigid portions and the resilient element in response to passage through the door means by an animal.

2. The panel of claim 1 wherein said sections are pivotally mounted on a vertical axis.

3. The panel of claim 1 wherein said rigid portion includes two openings.

4. The panel of claim 1 wherein the covering possesses a thickness less than said predetermined thickness.

5. The panel of claim 4 wherein the thickness of the resilient element approximately equals said predetermined thickness.

* * * * *

UNITED STATES PATENT OFFICE
CERTIFICATE OF CORRECTION

Patent No. 3,918,203    Dated November 11, 1975

Inventor(s) Clint E. Ellison

It is certified that error appears in the above-identified patent and that said Letters Patent are hereby corrected as shown below:

Column 1, line 21, should read " opportunity to go into fresh air, particularly if locked".

Column 2, line 21, should read "tional features contributing thereto and advantages ac-".

Column 2, line 39, "uesign" should be --design--.

Signed and Sealed this tenth Day of February 1976

[SEAL]

Attest:

RUTH C. MASON
Attesting Officer

C. MARSHALL DANN
Commissioner of Patents and Trademarks